United States Patent
Solowiejko (10) Patent No.: US 7,261,217 B2
(45) Date of Patent: *Aug. 28, 2007

(54) TAMPER EVIDENT MULTIPLE DOOR CLOSURE

(75) Inventor: George Solowiejko, Rockford, IL (US)

(73) Assignee: J.L. Clark, Inc., Rockford, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/347,158

(22) Filed: Feb. 3, 2006

(65) Prior Publication Data

US 2006/0144874 A1     Jul. 6, 2006

Related U.S. Application Data (63) Continuation of application No. 10/643,408, filed on Aug. 19, 2003, now Pat. No. 7,021,482.

(51) Int. Cl.
*B65D 51/18* (2006.01)

(52) U.S. Cl. .................... 220/254.2; 222/480

(58) Field of Classification Search ............ 220/254.2, 220/254.1, 254.3–254.9, 258.3, 258.4, 258.5, 220/265–267; 215/901; 222/480, 482, 153.06, 222/541.1, 541.6
See application file for complete search history.

(56) References Cited

U.S. PATENT DOCUMENTS

| | | | |
|---|---|---|---|
| 779,339 A | 1/1905 | Wulff | |
| 844,640 A | 2/1907 | West | |
| 961,991 A | 6/1910 | Ullrich | |
| 2,006,588 A | 7/1935 | Ehret | |
| D122,315 S | 9/1940 | Heller | |
| D153,270 S | 4/1949 | Erb | |
| 3,155,285 A | 11/1964 | Van Baam | |
| D200,270 S | 2/1965 | Waterman | |
| D204,509 S | 4/1966 | Waterman | |
| 3,251,509 A | 5/1966 | Foster | |
| 3,255,928 A | 6/1966 | Foster | |
| 3,370,757 A | 2/1968 | Foster | |
| 3,469,732 A | 9/1969 | Foster | |
| 3,805,993 A | 4/1974 | Enzie et al. | |
| 4,024,976 A | 5/1977 | Acton | |
| D272,807 S | 2/1984 | Ruhl | |
| 4,437,593 A | 3/1984 | Bullock, III | |
| 4,463,869 A | 8/1984 | Lewis | |
| D278,115 S | 3/1985 | Leininger | |
| 4,592,480 A | 6/1986 | Hart et al. | |
| 4,610,371 A | 9/1986 | Karkiewicz | |

(Continued)

FOREIGN PATENT DOCUMENTS

GB          1041816         10/1987

(Continued)

*Primary Examiner*—Lien M. Ngo
(74) *Attorney, Agent, or Firm*—Leydig, Voit & Mayer (57) ABSTRACT

A server lid for a container with an integral tear strip tamper evident feature. A tear strip for the tamper evident feature is molded as an adjunct to a base member which forms the closure. The tear strip is joined to the base by at least one frangible web, and hinges about the frangible web to overlie front edges of one or more flaps formed in the server lid. Ultrasonic welds connect the overlying tear strip to the flaps or adjacent the flaps for providing a tamper evident feature.

6 Claims, 9 Drawing Sheets

U.S. PATENT DOCUMENTS

| | | |
|---|---|---|
| 4,621,744 A | 11/1986 | Foster |
| 4,658,980 A | 4/1987 | Lindstrom |
| 4,660,735 A | 4/1987 | Peschardt et al. |
| 4,669,630 A | 6/1987 | Kenyon, II |
| 4,682,706 A | 7/1987 | DeVore et al. |
| 4,724,977 A | 2/1988 | Cleevely et al. |
| 4,732,293 A | 3/1988 | Landis |
| 4,759,465 A | 7/1988 | Landis |
| D312,190 S | 11/1990 | Ciaccio |
| 5,052,572 A | 10/1991 | Pherigo |
| 5,219,087 A | 6/1993 | Christensson |
| 5,273,176 A | 12/1993 | Diaz |
| 5,482,172 A | 1/1996 | Braddock |
| 5,617,968 A | 4/1997 | Luburic |
| 5,626,251 A | 5/1997 | Luburic et al. |
| D398,524 S | 9/1998 | Waterhouse |
| 5,934,495 A | 8/1999 | Chiodo |
| D448,295 S | 9/2001 | Mozes |
| 6,422,411 B1 | 7/2002 | Gray |
| D464,567 S | 10/2002 | Baerenwald et al. |
| 7,021,482 B2 | 4/2006 | Solowiejko |
| 7,114,627 B2 | 10/2006 | Solowiejko |
| 2006/0000833 A1 | 1/2006 | Boots et al. |

FOREIGN PATENT DOCUMENTS

| | | |
|---|---|---|
| GB | 3011696 | 7/2003 |

TAMPER EVIDENT MULTIPLE DOOR CLOSURE

CROSS-REFERENCE TO RELATED APPLICATIONS

This patent application is a continuation of U.S. patent application Ser. No. 10/643,408, filed Aug. 19, 2003 now U.S. Pat. No. 7,021,482, and the entire disclosure of which is incorporated herein by reference in its entirety.

Field Of The Invention

This invention relates to closures, and more particularly to a tamper evident feature on a multiple door closure.

BACKGROUND OF THE INVENTION

Tamper evident closures are important in a number of areas, particularly in the food industry. While the concept of the tamper evident closure is a good one in providing the consumer some assurance that the contents of the container being purchased have not been altered after packaging, the tamper evident feature can also introduce packaging problems.

For example, in the field of spice containers, multiple door closures are sometimes used. A common type of container for spices is a rectangular can, historically metal, but now also sometimes plastic, which has a rigid plastic server lid affixed to the open end of the can. The server lid includes dispensing ports covered by flaps which are typically hinged to the base of the lid. Typically the lid has multiple flaps covering the various dispensing ports. The dispensing ports may be in the form of sift holes for sprinkling the spice, a pour hole for pouring spice out of the container or a spoon hole for spooning a measured amount out of the container, or any combination thereof.

When placing multiple flaps on a container having a lid of limited dimension, the further inclusion of a tamper evident feature sometimes requires compromises which are not acceptable in all cases. For example, Gray, U.S. Pat. No. 6,422,411, assigned to the assignee of the present invention, describes a tamper evident overcap for a multiple flap spice container. The overcap approach is useful in that it does not require a reduction in the size of the ports or flaps on the cover. However, the complication it introduces is the need to mold an additional piece, the overcap, and to assemble the overcap to the server lid.

Foster, U.S. Pat. No. 4,621,744, also assigned to the assignee of the present invention, shows another approach. As with the typical multiple flap spice closure, the device described in the Foster patent can be molded as a single unit. However, in order to achieve the tamper evident feature, the tear strip in Foster uses valuable "real estate" on the closure and requires a reduction in size of the ports and the flaps which cover them. In addition, since the tear strip and the flaps with which it is associated are more or less coplanar on top of the closure, removing of the tear strip, by tearing it upwards, has a tendency to also attempt to open the flaps. This is undesirable to some users.

An additional significant issue raised by the closure in the Foster patent, and others like it, is the requirement on the spice lid manufacturer to prepare a new set of molds to include the tamper evident feature. As will be known to those skilled in this art, the multiple cavity molds which are used to make closures such as these are extremely expensive, highly engineered units. In addition, the lead time for securing molds is often significant. If one were to have the basic three-flap design of the Foster patent in a non-tamper evident configuration, in order to add tamper evidency as shown in the Foster patent would require a redesign of the mold to reconfigure the ports, the flaps and the basic cover configuration. The old existing molds would not be usable, and a completely new set of molds would be required to add the tamper evidency feature.

BRIEF SUMMARY OF THE INVENTION

In view of the foregoing, it is a general aim of the present invention to provide a tamper evident feature in a multiple door spice container closure which overcomes one or more of the foregoing problems.

An object of the present invention is to provide a tamper evident feature which does not require the use of flap or port "real estate" on the container, but can be used with an existing port and flap configuration.

In that regard, it is an object of the present invention to provide a tamper evident feature for a multiple door spice container closure which can be achieved by way of minor rework of an existing set of molds.

Accordingly, the invention provides a closure for a container which is formed as a single molded unit. The closure has a base member constructed to overlie and fit to the associated container. The base member has at least one, and in a preferred embodiment a plurality of dispensing openings formed therein. At least one, and in the preferred embodiment a plurality of flaps are joined to the base member at a elongated hinge line, and are positioned for closing the dispensing opening or openings. The flap or flaps have front edges opposite to and parallel to the hinge line. A tear strip is formed on an edge of the base opposite the hinge line and connected to the base by at least one frangible web. The tear strip is adapted to hinge about the frangible web to a position overlying the front edge of the flap or flaps. Plastic welds connect the overlying edge of the tear strip to provide a tamper evident feature.

In a preferred practice of the invention, three frangible webs connect the seal strip to the base, and some of the plastic welds are formed directly to front edges of the flaps, whereas others are formed on portions of the base adjacent the front edge of the flap.

Other aspects, objectives and advantages of the invention will become more apparent from the following detailed description when taken in conjunction with the accompanying drawings.

DETAILED DESCRIPTION OF THE PREFERRED EMBODIMENTS

Figure 1:
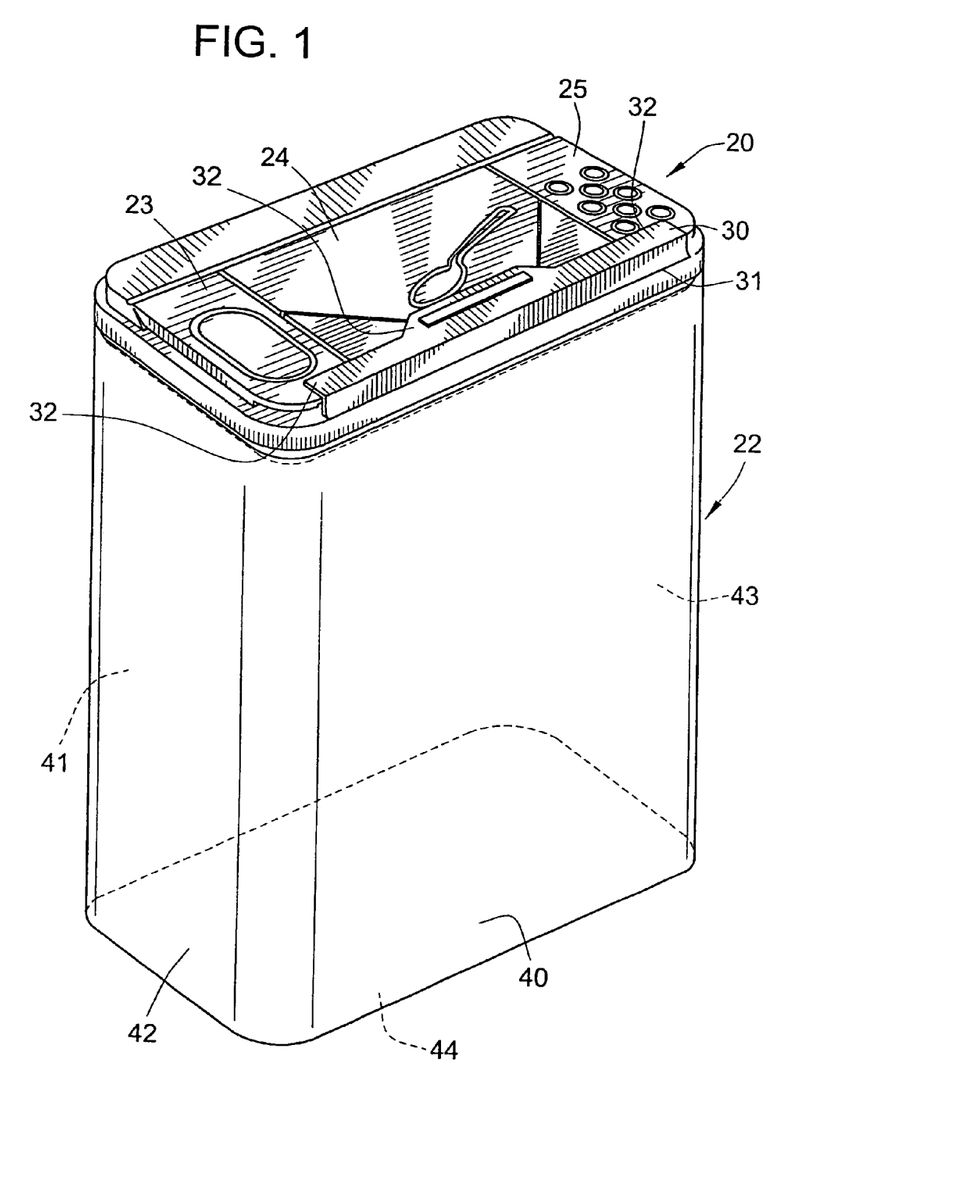
FIG. 1 is a perspective view showing a spice container with a tamper evident feature constructed in accordance with the present invention.
Figure 2:
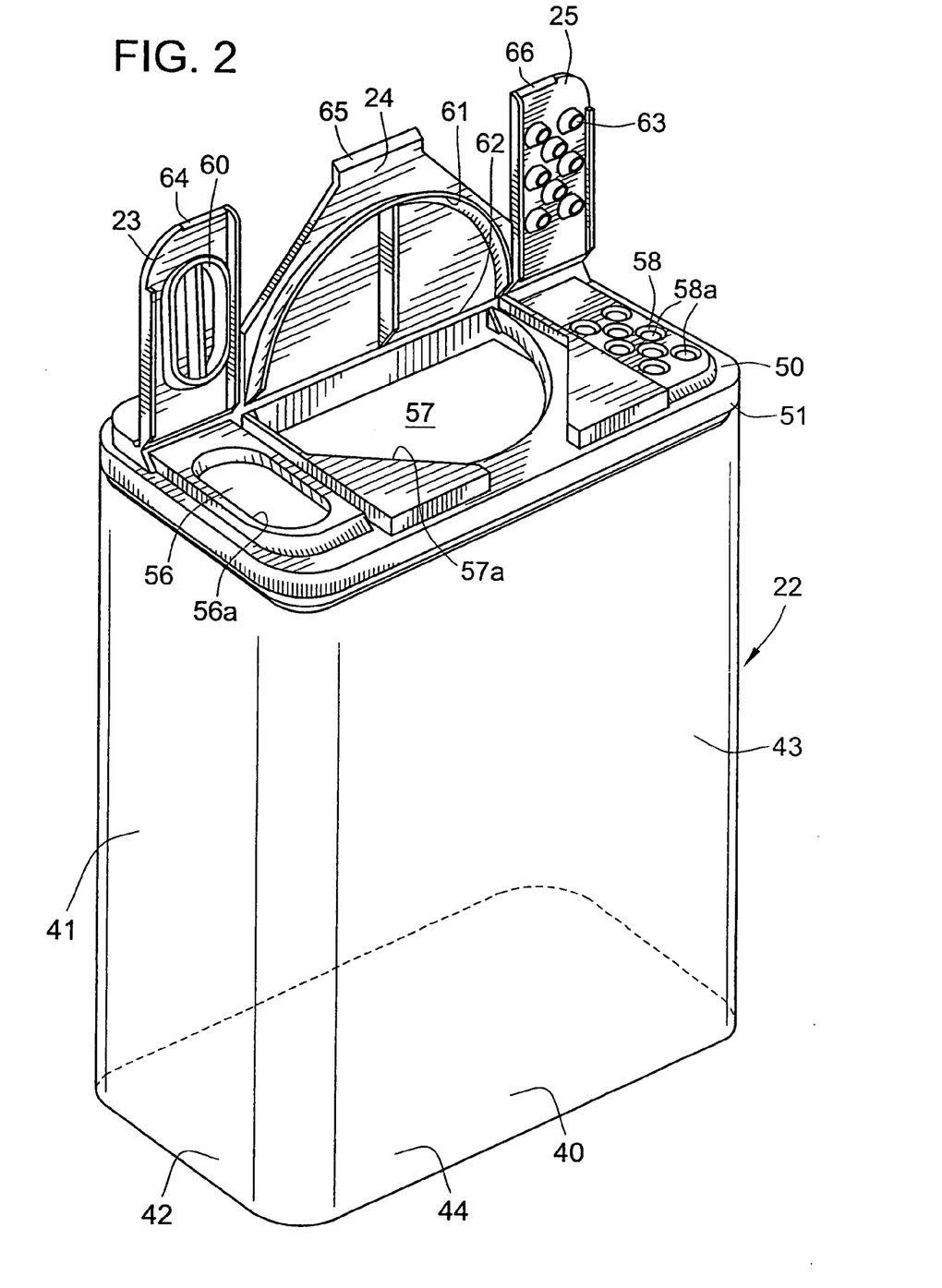
FIG. 2 shows the container of FIG. 1, with the tamper evident tear strip removed and all of the flaps open.

Turning now to the drawings, FIG. 1 illustrates a tamper resistant closure 20 fixed to a container 22 in accordance with the preferred embodiment of the present invention. FIG. 2 illustrates the same container and closure with the tamper evident tear strip removed and all flaps open. The spice container 22 is preferably rectangular, is typically metal but can be plastic. The lid 20 is a server type lid adapted to close the upper open end of the container 22. The server type lid is sometimes formed with a single flap, but preferably has a plurality of flaps (three flaps 23, 24 and 25 are illustrated in the drawings) for allowing the user to access the contents of the container via the respective types of closure ports. A tamper evident tear strip 30, having a first elongated edge 31 fixed to the cover portion of the closure 20 and a second portion 32 folded over and covering each of the flaps 23-25, secures all the flaps in the closed position. In order to access the contents of the container, it is necessary to remove the tear strip 30, which allows access to the edges of the flaps to allow individual ones to be opened. FIG. 2 shows all of the flaps 23-25 open, although it will be understood that typically the user will open only one of such flaps at a time.

In greater detail, the container 22 is a rectangular cube having pairs of generally parallel opposing sides including a wide front 40 and back 41, and somewhat narrower sides 42, 43. A rectangular bottom 44 closes the bottom of the container. When the can is of metal construction, the sides 40-43 will be a single piece of metal having a single seam, and the bottom 44 will be seamed to the sides. When the container is plastic, the sides 40-43 and bottom 44 will be a single molded unit.

Figure 4:
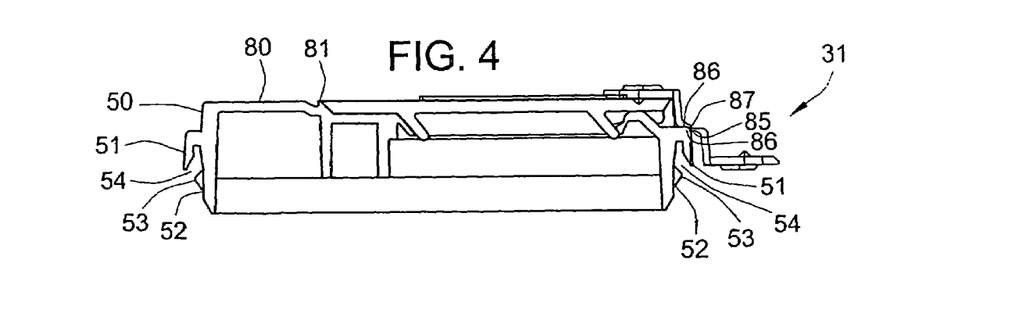
FIG. 4 is an end view of the closure of FIG. 3.

The server lid 20 is made from relatively rigid plastic material and includes a base member 50 with one or more downward depending flanges 51. FIG. 4 shows the base 50 has two downwardly depending flanges 51, 52, namely outer and inner flanges, with a raised bead 53 on the flange 52 and leaving a narrow gap 54 for receipt of the front or side walls of the associated container. This is the type of flange arrangement which is used with a metal container. Typically the top of the metal container is rolled and fits through the gap 54 to be captured between the flanges 51, 52, with the lip 53 substantially preventing removal of the lid from the container. When the closure is to be used with a plastic container, a different form of lip, also well known to those skilled in the art, will be utilized.

The closure 20 as illustrated in FIG. 2 can be considered conventional, in that the tamper evident strip is not shown, and the flaps and doors are such as would be provided in a normal container without a tamper evident feature. This is a significant attribute of the invention, in that the tamper evident strip is provided without the need to reduce the size of or otherwise reconfigure the ports or flaps which cover them.

Referring in greater detail to the exemplary container, as noted above it is shown to include three flaps and three ports. In the illustrated embodiment a first dispensing port 56 is provided for pouring the spice contents from the container.

A second port 57 is shaped and sized to allow a spoon to pass through the port into the container, for spooning spice from the container. The final port 58 has a plurality of apertures which allow for the spice contained within the container to be shaken and sifted from the container through the apertures which from the sifting dispensing port.

Figure 3:
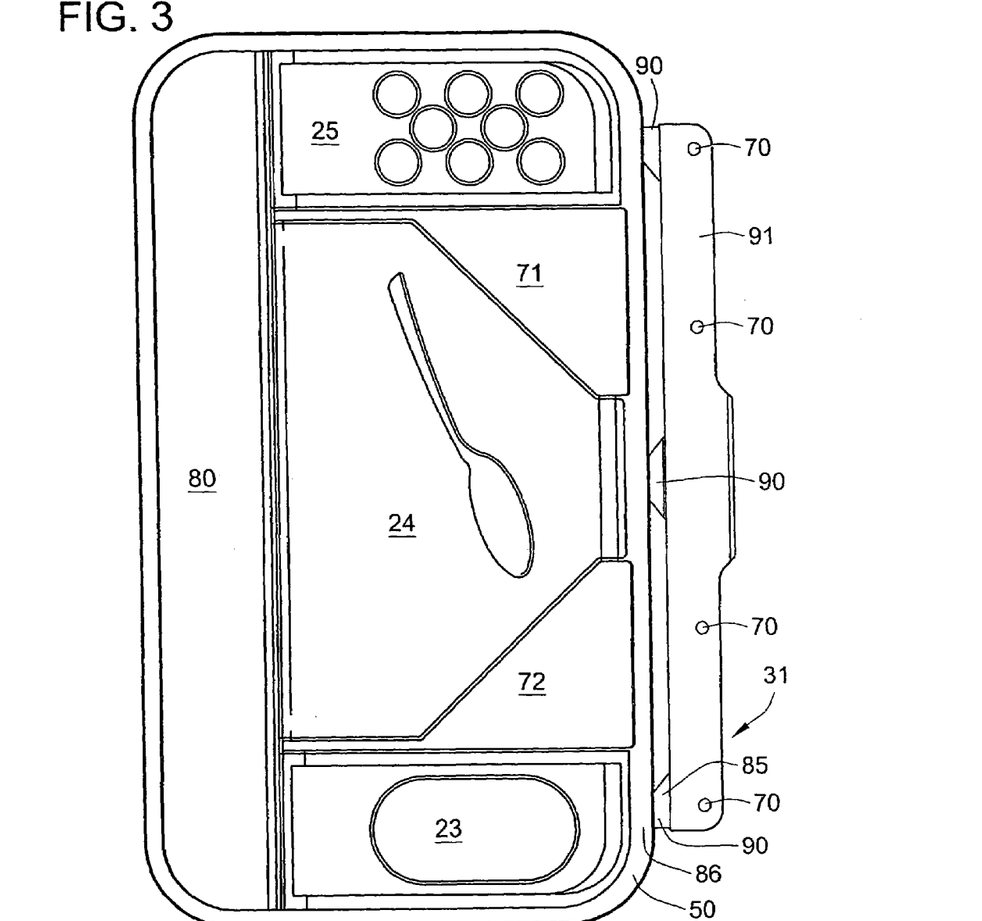
FIG. 3 is a plan view showing the closure in the as molded state except that the flaps have been closed.

As best seen in FIGS. 3 and 4, the base member 50 has a narrow platform 80 which is joined to the flaps 23-25 at an elongated hinge line 81. As is well known to those skilled in this art, the closure is molded as a single unit, and the flaps are molded integrally with the base member so that they are swingably connected to the top panel along a hinge 81 which extends parallel to the front edge of the flap. The hinge 81 is formed by holding spaced sections of plastic along the junction between the raised portion 80 and the flap. This type of structure is sometimes referred to as a living hinge. The flaps are typically molded while in an inclined position and are closed after the closure has been ejected from the molding die.

The flaps 23-25 have undersides which seal with the associated port. For example, the door 23 which covers the pouring port has an oval shaped depending ring 60 which is sized to engage the periphery 56a of the pouring port 56. Similarly, the flap 24 which covers the spooning port has a composite ring including an arcuate section 61 and a straight section 62 which match the periphery 57a of the spooning port 57. When the door is snapped down over the port, the rim 61-62 will fit through the port aperture 57 and provide a snap fit with the aperture 57a. The flap 25 which covers the sifting opening has a plurality of plugs 63 which are positioned and sized to snap into the apertures 58a which make up the sifting port 58. It will be seen that each of the flaps 23-25 has an undercut finger grip section 64, 65 or 66 which allows the fingernail of a user to be slipped into a crevice formed between the relieved section and the base 50 to allow the user to pry that particular flap open.

Turning again to FIG. 1, it will be seen that the flaps 23-25 are all secured by a single tear strip 30 which overlies each of the flaps; The tear strip 30 is heat bonded, such as by ultrasonic welding, to secure each of the flaps 23-25, such that the flap is not readily opened without removing the tear strip. The ultrasonic welding can be accomplished on the flap itself, particularly such as for the end flaps 23 and 25, and can also be accomplished on a non-movable section of the lid adjacent to flap, as can be accomplished for the larger central flap 24. FIG. 3 shows a plurality of buttons or nibs 70 formed on the tear strip which define the areas for ultrasonic welding. Alternatively the buttons can be located on the flaps or container top in corresponding locations. It will be seen that the outer buttons will weld directly to the flap, whereas the intermediate buttons will weld to stationary portions 71, 72 of the cover, adjacent the flap door. It is also possible, of course, to weld the central portion of the strip directly to the central flap 24, but the illustrated form of ultrasonic welding is preferred, because it eases the task of removing the tear strip, as will be described below.

In accordance with the invention, a tear away strip is associated with the closure for providing a tamper evident feature for all of the closure flaps. It will be noted that in cases where the closure has only a single flap, the invention is still applicable. It is particularly advantageous with multiple flaps, as taught in connection with the preferred embodiment, but provides many of the advantages of the invention even with only a single flap, or with individual tear strips, one for each of multiple doors.

FIGS. 3 and 4 show the tear away strip in the as molded condition. The closure itself is not as-molded, since the flaps are all closed, which is a post molding operation. However, the tear strip 30 is molded as an extension of and attached to the base 20 as shown in these illustrations. It is seen that frangible webs in the illustrated embodiment shown are thin living hinges 85 that join an edge 86 of the base 50 to a connecting member 87 of the tear strip, the living hinges 85 are formed at the edge of the base 50 and are parallel to the hinge line 81 about which the flaps pivot. Since the flaps are based on a rectangular geometry, the tear strip, being parallel to the hinge line, will also be parallel to the front edges of the flaps. Preferably the frangible webs are of reduced thickness, most preferable about 25% or less of the nominal wall thickness, in order to facilitate removal by the user.

As shown in plan view in FIG. 3, the living hinges form relatively short frangible webs 90 which connect the tear strip body 91 to the base 50. Preferably the webs 90 are relatively short in length, and occupy substantially less than half of the length of the tear strip body 91. This, as will become apparent, allows the tear strip to be readily separated from the base after it is partly opened. However, it is also possible to connect the tear strip to the base continuously along the length of the tear strip 91 if desired, although the short frangible hinges are preferred.

The shape of the tear strip beyond the connecting portion 87 can take various forms. For example, a relatively flat tear strip having score lines about which it can be folded to a position overlying the edges of the flaps, is possible and in some cases acceptable. However, it is preferred to utilize the tear strip as having a configuration as illustrated generally in FIG. 5, because the use of a tear strip in that form allows the closure to provide a stacking lip for the container. Thus, the tear strip of the preferred embodiment includes a generally right-angled bend 94 near its base connected to an arm 95. A further right-angled bend 96 leads to an extended strip portion 97 which overlies the front edges of the flaps. A relatively small number of ultrasonic weld nibs 70 (four are shown in FIG. 3) are formed on the underside of the overlying strip portion 97. In addition, a bevel 98 at the edge 99 thereof arranged in a tab section 100 of the overlying strip provides convenient access to the user to pry up the strip portion 91 of the tear strip as a first step in removing the tear strip.

Figure 5:
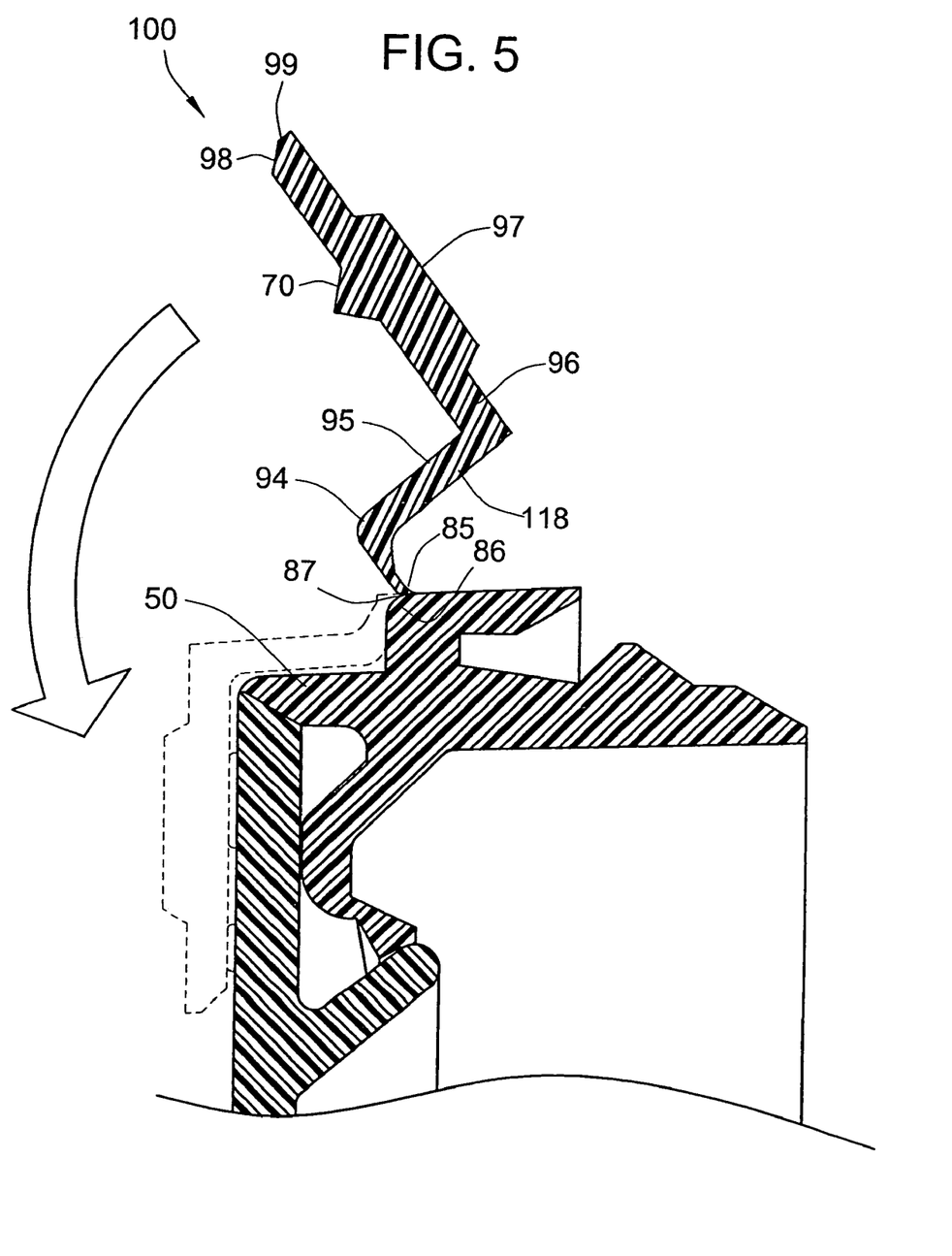
FIG. 5 is a partial sectional view illustrating the tamper evident tear strip, after molding, being moved to its operative position.
Figure 6:
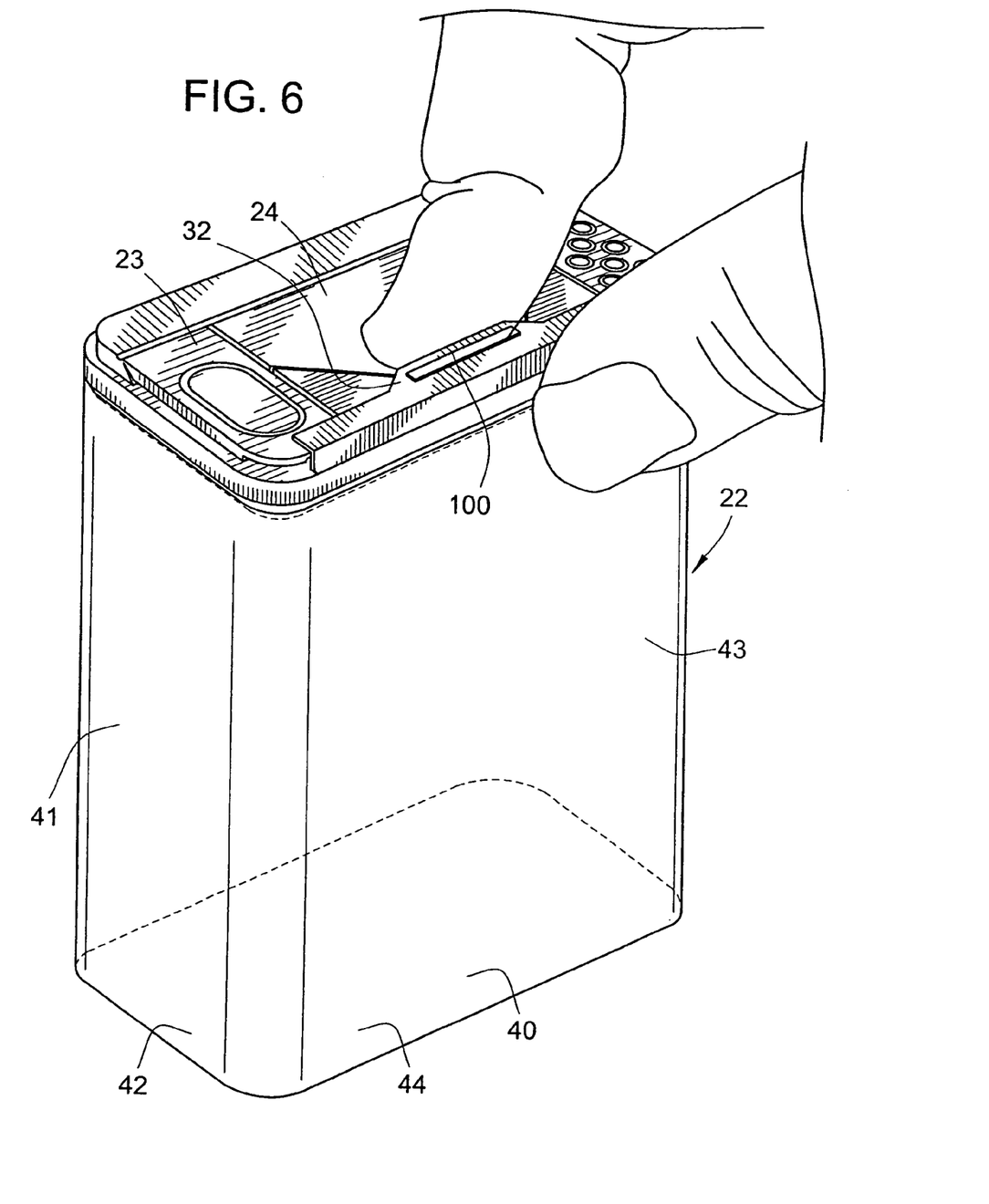
FIGS. 6 and 7 show two steps by which the consumer removes the tamper evident tear strip before using the container contents.

After the closure is ejected from the mold and the doors are closed, the tear strip is then rotated approximately 180° to the dashed line position shown in FIG. 5 (or the solid line position shown in FIG. 6). Ultrasonic welding equipment then causes the nibs 70 to melt into the door or door-adjacent portions to ultrasonically seal the strip portion 91 of the tear strip over the top edges of the flaps. The bottom of the tear strip remains connected to the base 50 by virtue of the frangible webs 90. Thus, if a container is encountered in which the upper tear strip 91 remains secured to the flap portions and the frangible webs 90 are intact, the user can safely conclude that the closure has not been opened for tampering. However, if either the frangible webs 90 are broken or if the strip portion 91 of the tear strip is lifted, there is the possibility of tampering.

Figure 7:
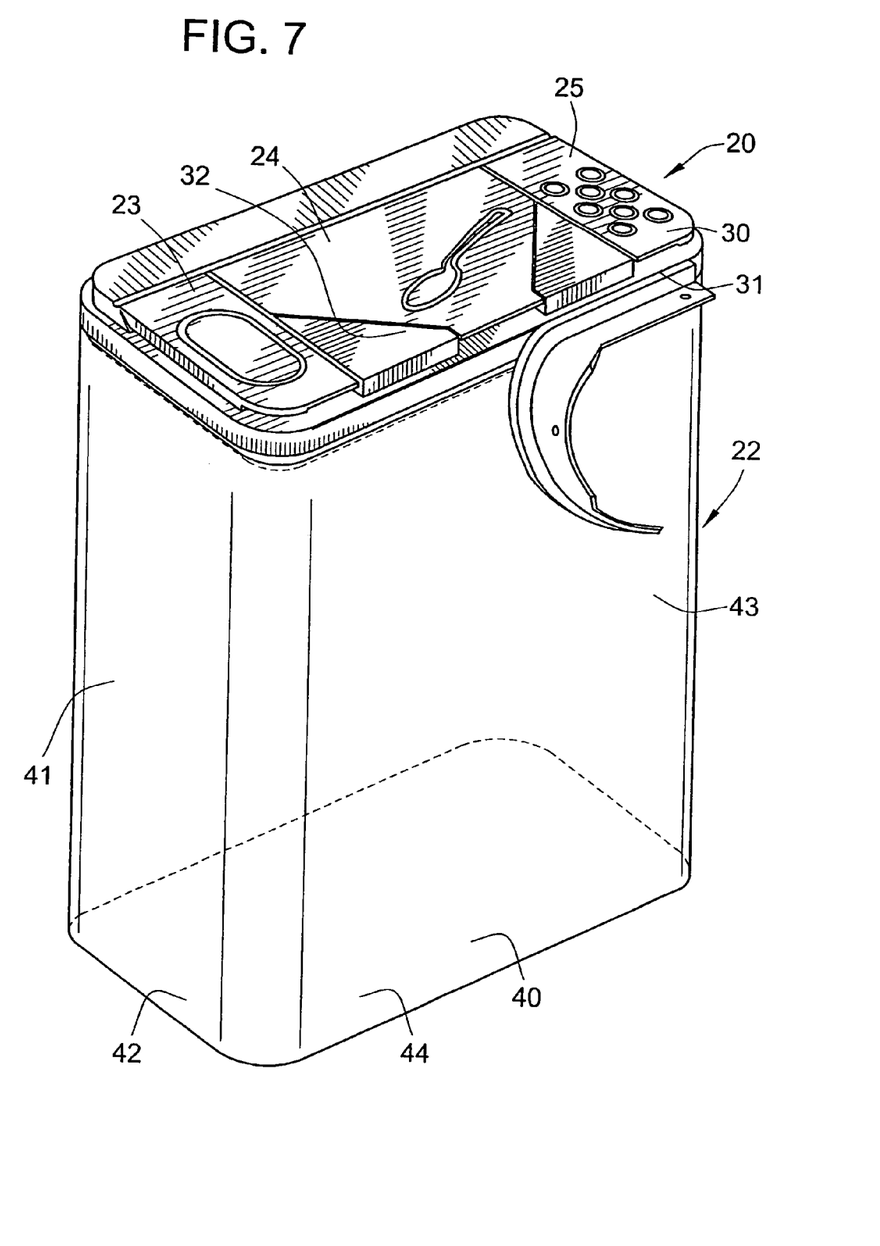

FIGS. 6 and 7 illustrate the removal of the tear strip after the user has acquired a spice container. As a first step, the user inserts a tool or a fingernail under the tab 100 and lifts the tab. The ultrasonic welds 70 break and the strip portion 91 of the tear strip is then free. It is then simply a matter of breaking the frangible webs 90, which can readily be done by tearing the tear strip downwardly (or upwardly for that matter) as illustrated in FIG. 7. The tear strip is thus removed and the container is ready for use. It is an important feature of the invention that the container, when ready to use, as shown for example in FIG. 2, would be identical to a prior art container which had no provision for a tear strip. There is no need to reduce the size of the ports or alter the size of the flaps or create a land area opposite the hinge line of a closure in order to provide a tamper evident feature. The feature is provided as an addendum to the already existing cap.

Figure 8:
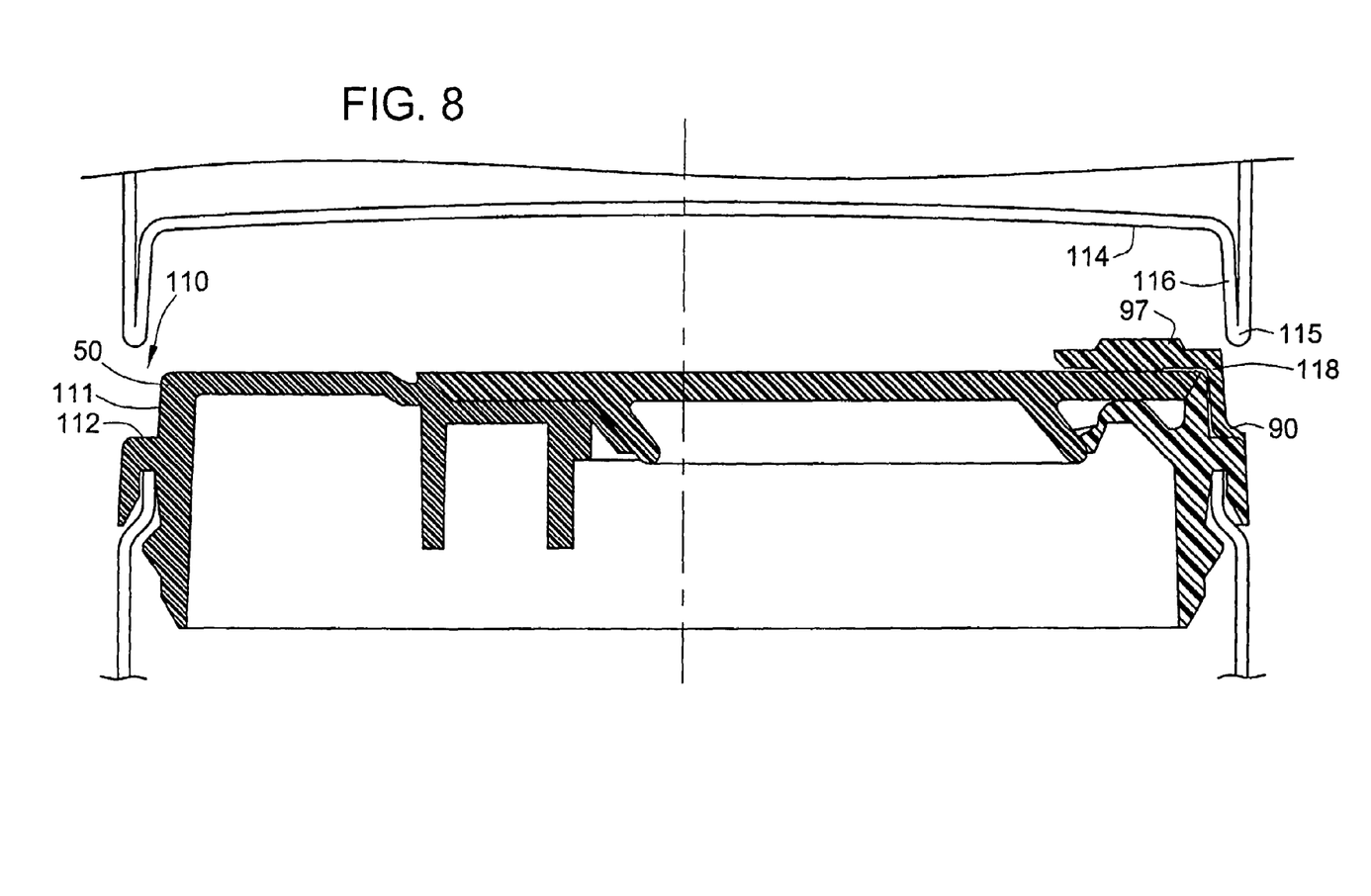
FIGS. 8 and 8a are sectional views taken along the lines 7-7 and 8-8 respectively of FIG. 6 and showing the stacking rim feature of the container with tamper evident closure.
Figure 8A:
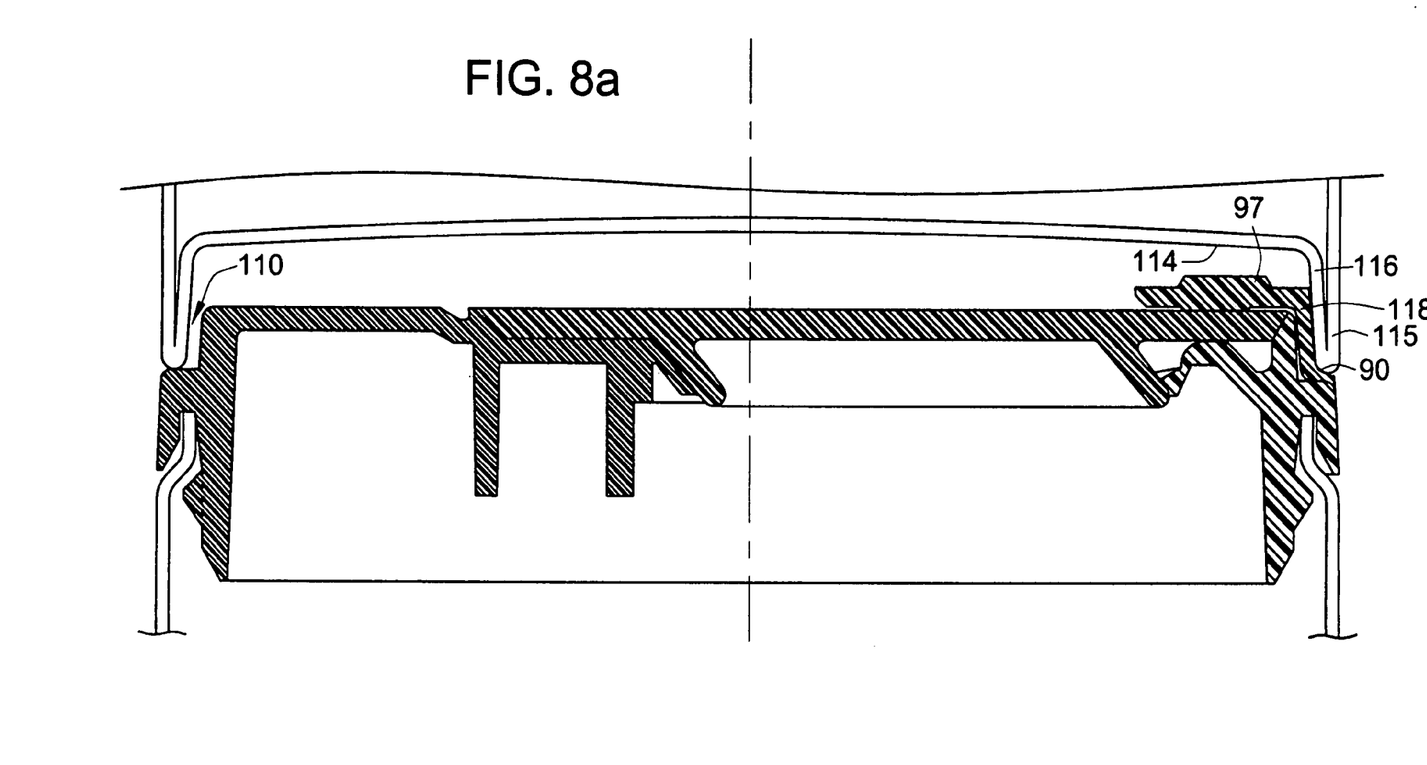

It is a further feature of the invention that the tear strip is provided in such a way that the stackability feature of the basic closure remains intact. As illustrated in FIGS. 8 and 8a, the container closure has a rim 110 which, at the periphery of the closure 50, which has generally vertical walls 111 and a generally horizontal floor 112. The container is formed with a recessed bottom 114 that provides a peripheral ridge 115 serving as a base for the container. The rim 110 is dimensioned to be able to fit closely within the flange 115 up against an inner wall 116 thereof.

In practicing this aspect of the invention, the tear strip has the aforementioned right angled configuration, primarily the right angle 94, to provide an upstanding wall 118 which, because of its thinness, generally corresponds to the upstanding wall of the basic closure. The tolerances are such that the base rim 115 of the container will fit over the upper portion of the closure, including the three frangible webs 90 to allow interfitting of one container bottom with the container closure of the next, to allow the containers to be stacked on a grocery shelf without substantial danger of slipping or tipping. It will also be seen from a concurrent view of FIGS. 3 and 5, and also by comparison of FIGS. 8 and 8a, that the depending wall portion 118 is present only in the areas of the frangible web, and that the overlying tear strip portion 97 terminates before the depending right angle section 118.

A significant feature of the invention is the ability to add a tear strip to an existing container without altering the basic mold which forms the container. It will be appreciated by those skilled in this art that molds are expensive, are highly engineered and to introduce mold changes is an expensive proposition which needs to be economically justified. However, in practicing the present invention, the basic mold configuration can be left in place, and rework done to an area of the mold adjacent to the portion which forms the closure. Thus, the closure and its fits and finishes will remain unchanged, and the only addition or change to the mold section is in a new area for forming the tear strip appended to the base. The manner in which this is accomplished is schematically illustrated in FIG. 9.

Figure 9:
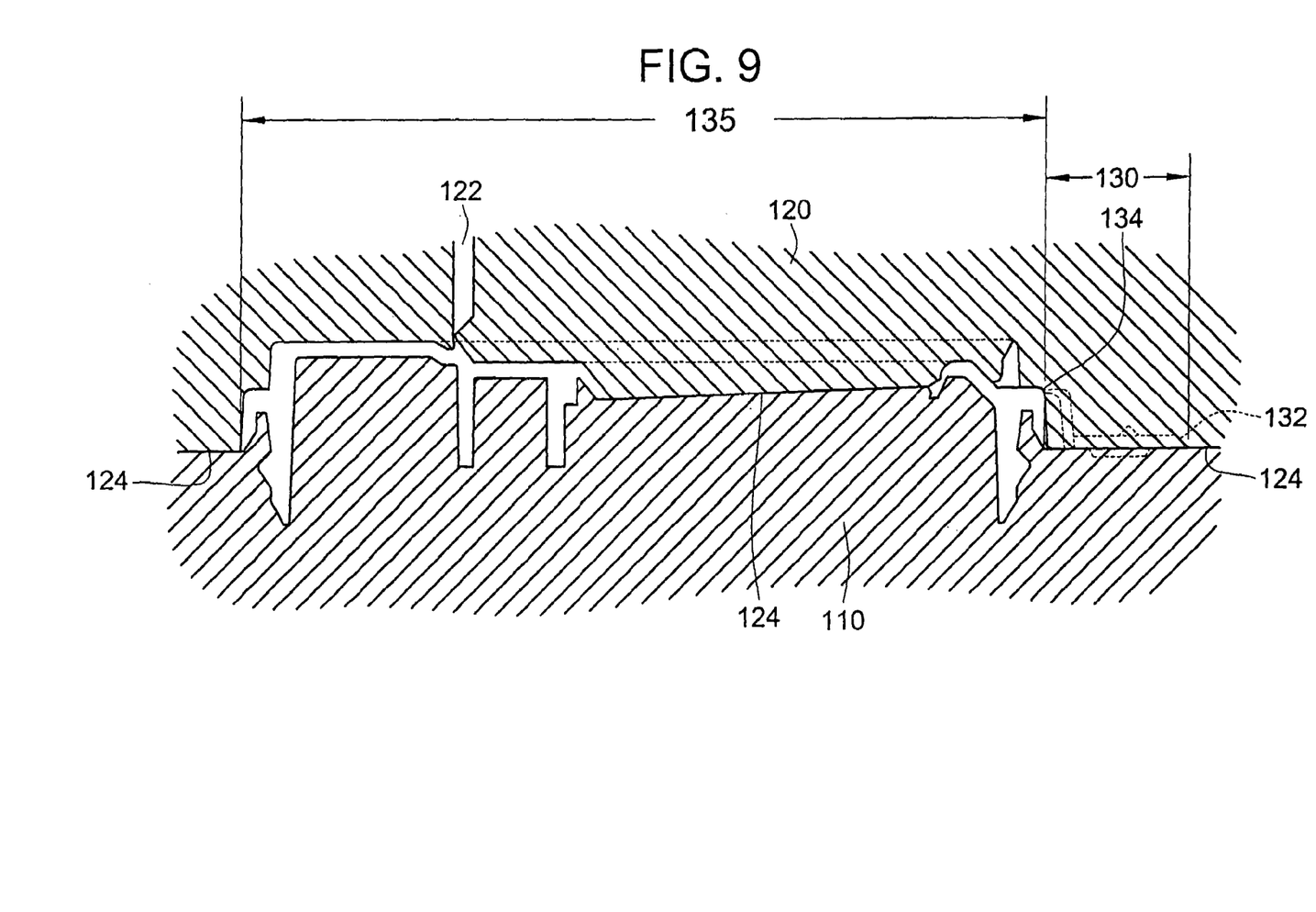
FIG. 9 somewhat schematically illustrates the rework of a mold needed to add a tamper evident feature to an existing closure.

FIG. 9 shows in very rough schematic fashion a pair of dies capable of forming a closure in accordance with the present invention. A lower die 110 and an upper die 120 (of two sections so as to form the door portion 122) are provided. The dies split along a parting line 124 (and a similar line in connection with the upstanding cover section 122) to allow the part to be ejected after it is molded.

In order to incorporate a tear strip into the die set schematically illustrated in FIG. 9, it is simply necessary to rework the mold in an adjacent area indicated at 130. The section 130 of the mold is reworked to form the tear strip configuration 132 shown in dashed lines. This is accomplished by adding some material to the mold outside of the mold periphery, such as by welding on additional material. And in the case of both dies in the adjacent area 130, material will need to be removed to form the configuration 132. This material removal is typically accomplished by EDM machining. In the end, a cavity which is indicated by the dashed lines in the area 132 will be formed. The thin hinge 134 which joins the newly formed tear strip to the remainder of the mold will allow material to feed through to form the tear strip. With that minor alteration, there is no other change needed to the basic mold area identified by the reference numeral 135. Thus, that section of the mold can remain in place, can remain unchanged and need not be retested or reengineered. The tear strip 130, while it is important in providing tamper evidency, is relatively easily checked out to see that the frangible webs have sufficient strength, the door folds to the proper position over the flaps, and the ultrasonic weld nibs are in the positions expected. The change, although costly, is not prohibitively expensive and allows an existing container, or a container of an existing shape, to have its closure modified to include a tear strip, but without requiring a complete reengineering of the closure.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A closure for a container, the closure being a single molded plastic unit and comprising in combination:
   a. a base member constructed to close an open end of an associated container, the base member having at least one dispensing opening formed therein,
   b. a flap joined to the base member at a hinge line along one edge of the base, the flap being positioned to close the dispensing opening, and when closed, having a front edge which is opposite to and parallel to the hinge line,
   c. a tear strip formed on an edge of the base member opposite the hinge line and connected to the base member by at least one frangible web, the tear strip hinging about the at least one frangible web to a position overlying the front edge of the flap, and the at least one frangible web of the tear strip having an upstanding shoulder connected to a horizontal ledge such that when the tear strip is sealed over the flap, the tear strip presents a stacking shoulder, and
   d. at least one plastic weld for connecting the overlying edge of the tear strip to the flap to provide a tamper evident feature.

2. The closure of claim 1 wherein at least one of the at least one plastic weld connects the tear strip to at least one flap.

3. The closure of claim 1 wherein at least one of the at least one plastic weld connects the tear strip to a portion of the base member adjacent a flap front.

4. The closure of claim 1 in which the base member has a peripheral shoulder for providing a stacking ledge.

5. The closure of claim 1 wherein a plurality of projections define the position of the at least one plastic weld, and the at least one plastic weld is an ultrasonic weld.

6. The closure of claim 1 in which the at least one frangible web joining the tear strip to the base member is less than twenty-five percent of the thickness of the base member whereby the tear strip is readily removed upon opening of the closure.

* * * * *